(12) United States Patent
Nobili et al.

(10) Patent No.: US 11,609,626 B2
(45) Date of Patent: Mar. 21, 2023

(54) METHOD AND CONTROL DEVICE FOR OPERATING A VIRTUAL REALITY HEADSET IN A VEHICLE

(71) Applicant: HOLORIDE GMBH, Munich (DE)

(72) Inventors: Simona Nobili, Munich (DE); Daniel Profendiner, Ingolstadt (DE)

(73) Assignee: HOLORIDE GMBH, Munich (DE)

( * ) Notice: Subject to any disclaimer, the term of this patent is extended or adjusted under 35 U.S.C. 154(b) by 0 days.

(21) Appl. No.: 17/637,606

(22) PCT Filed: Sep. 22, 2020

(86) PCT No.: PCT/EP2020/076451
§ 371 (c)(1),
(2) Date: Feb. 23, 2022

(87) PCT Pub. No.: WO2021/083584
PCT Pub. Date: May 6, 2021

(65) Prior Publication Data
US 2022/0283633 A1  Sep. 8, 2022

(30) Foreign Application Priority Data
Oct. 29, 2019  (EP) ..................................... 19205788

(51) Int. Cl.
*G06F 3/01* (2006.01)
*G06T 7/73* (2017.01)
(Continued)

(52) U.S. Cl.
CPC .............. *G06F 3/012* (2013.01); *B60K 35/00* (2013.01); *G06F 3/0304* (2013.01); *G06T 7/74* (2017.01);
(Continued)

(58) Field of Classification Search
CPC ....... G06F 3/012; G06F 3/0304; B60K 35/00; B60K 2370/177; G06T 7/74;
(Continued)

(56) References Cited

U.S. PATENT DOCUMENTS 9,459,692 B1  10/2016  Li
9,928,544 B1*  3/2018  Hasan ..................... G06T 11/00
(Continued)

FOREIGN PATENT DOCUMENTS

| DE | 102018109428 | 10/2018 |
|---|---|---|
| WO | 2016187757 | 12/2016 |
| WO | 2017/172984 | 10/2017 |

*Primary Examiner* — Grace Q Li
(74) *Attorney, Agent, or Firm* — Fitch, Even, Tabin & Flannery LLP

(57) ABSTRACT

The invention relates to a method for operating a virtual reality headset in a vehicle, in which at least an instantaneous orientation of the virtual reality headset is determined by means of an inertial measurement unit arranged on the virtual reality headset, and a corresponding control device. Based thereon and on vehicle localisation data, a virtual perspective of a virtual environment displayed in the virtual reality headset is simulated. Therein, a relative arrangement of the virtual reality headset with respect to the vehicle interior is determined through an optical capture device arranged on the virtual reality headset. Corresponding data from the inertial measurement unit and the optical capture device are fused together to determine a corrected orientation or pose of the virtual reality headset with respect to the vehicle interior for simulating the virtual perspective.

15 Claims, 1 Drawing Sheet

(51) Int. Cl.
    *G06F 3/03*    (2006.01)
    *B60K 35/00*    (2006.01)
(52) U.S. Cl.
    CPC .................. *B60K 2370/177* (2019.05); *G06T 2207/10016* (2013.01); *G06T 2207/20084* (2013.01); *G06T 2207/30268* (2013.01)
(58) Field of Classification Search
    CPC . G06T 2207/10016; G06T 2207/20084; G06T 2207/30268
    See application file for complete search history.

(56) References Cited

U.S. PATENT DOCUMENTS

| | | | |
|---|---|---|---|
| 10,043,076 B1* | 8/2018 | Zhang | G06T 17/05 |
| 10,416,755 B1 | 9/2019 | Erivanticev et al. | |
| 11,017,745 B2 | 5/2021 | Harr. et al. | |
| 2015/0317838 A1 | 11/2015 | Foxlin | |
| 2016/0041612 A1* | 2/2016 | Spiessl | G02B 27/0172 345/156 |
| 2018/0081426 A1 | 3/2018 | Rothkopf | |
| 2018/0308454 A1 | 10/2018 | Gusikhin et al. | |
| 2019/0004598 A1* | 1/2019 | Gordt | A63G 7/00 |
| 2019/0041979 A1* | 2/2019 | Kirchner | B64D 43/00 |
| 2019/0285418 A1* | 9/2019 | Rohde | G01C 21/30 |
| 2020/0209878 A1* | 7/2020 | Shoda | B60W 10/18 |
| 2020/0241631 A1* | 7/2020 | Trythall | G06F 3/012 |
| 2020/0271450 A1* | 8/2020 | Gorur Sheshagiri | G06F 3/0346 |

* cited by examiner

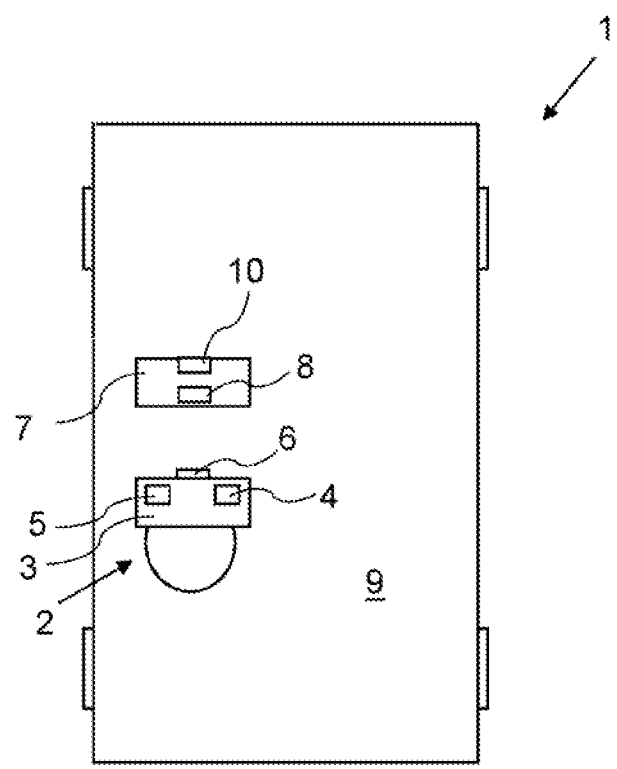

METHOD AND CONTROL DEVICE FOR OPERATING A VIRTUAL REALITY HEADSET IN A VEHICLE

CROSS-REFERENCE TO RELATED APPLICATIONS

This application is a § 371 national stage entry of International Application No. PCT/EP2020/076451, filed Sep. 22, 2020, which claims priority to European Patent Application No. 19205788.3, filed Oct. 29, 2019, the entire contents of which are incorporated herein by reference.

The present invention concerns a method and a control device for operating a virtual reality headset in a vehicle.

A virtual reality headset, often also called virtual reality glasses or virtual reality helmet, is a kind of head-mounted display which is intended to give the user a view into virtual reality. They are mostly used in computer and simulation games and are intended to give the players the most realistic game feeling possible (immersion).

Such virtual reality headsets can also be used in vehicles, for example in cars or other vehicles, so that vehicle occupants can enjoy virtual content during the journey. It is often intended that when using such virtual reality headsets, the user can immerse himself in a kind of virtual environment, which is displayed by means of displays or the like. It is often the case that head movements of the user who has put on the virtual reality headset are converted more or less one-to-one into corresponding virtual changes of perspective on the displayed virtual environment. Especially in moving vehicles it can be very difficult to capture head movements of users who have put on such virtual reality headsets reliably, exactly and with the required resolution.

WO 2017/172 984 A2 describes a virtual reality headset with a relative motion head tracker. The latter comprises one or more sensors that generate sensor data. This sensor data measures one or more characteristics that vary based on a pose of the headset and/or a pose of a vehicle wherein a user uses the headset. A processor of the relative motion tracker is configured to receive said sensor data and calculate therefrom a pose of the headset relative to the vehicle. It is further configured to generate, retrieve, select, or modify a display image based on said pose of the headset relative to the vehicle, and to transmit the display image to a display of the headset.

In another approach, DE 10 2018 109 428 A1 describes an in-vehicle system for projected reality. It comprises a headset for displaying a projected-reality image, a localizer device for determining a headset-pose in the vehicle, and a computing device. The latter is configured to receive the headset-pose and vehicle inertial data, to determine a stabilized image based thereon, and to provide the stabilized image to the headset.

U.S. Pat. No. 10,416,755 B1 describes a system comprising a plurality of sensor modules and a computing device coupled thereto. Each sensor module has an inertial measurement unit and is attached to a user to generate motion data identifying a sequence of orientations of the user. The plurality of sensor modules includes first and second subsets that share a common sensor module. The computing device provides orientation measurements generated by the first and second subsets to a first artificial neural network and a second artificial neural network, respectively. It then obtains as output therefrom first and second orientation measurements of a common part of the user on which the common sensor module is attached, respectively. The computing device then generates a predicted orientation measurement of the common part from combining the first and second orientation measurements of the common part.

It is therefore the task of the present invention to provide a solution by means of which a particularly exact and high-resolution capture of head movements of a user can be achieved while the latter has a virtual reality headset on inside a vehicle.

This task is solved by a method as well as by a control device for operating a virtual reality headset in a vehicle with the features of the independent claims. Further possible developments and configurations of the invention are indicated in the dependent claims, the description, and the FIGURE.

In the method according to the present invention for operating a virtual reality headset in a vehicle, vehicle localisation data that at least partly characterises a pose and/or movement of the vehicle with respect to a fixed world reference frame is captured and provided. In other words, this vehicle localisation data describes the position, orientation and/or movement of the vehicle in a coordinate system that is stationarily anchored to the outside world. The vehicle localisation data may be captured for example by means of an inertial measurement unit—or IMU for short—fixedly attached to the vehicle, a global positioning system, or the like. The vehicle localisation data can as a minimum comprise the output of an IMU rigidly attached to the vehicle, i.e. linear acceleration and angular velocity data, and/or orientation data as an output of a sensor fusion for the vehicle. Furthermore, at least an instantaneous orientation of the virtual reality headset is continuously determined by means of an inertial measurement unit (IMU), arranged on the virtual reality headset. Based at least partly thereon, a virtual perspective on a virtual environment displayed by means of the virtual reality headset is simulated. While said virtual environment is displayed by the virtual reality headset, the inertial measurement unit attached to the virtual reality headset continuously captures at least the instantaneous orientation of the virtual reality headset and thus in combination with the vehicle localisation data the orientation or pose of the virtual reality headset and therefore also of the head of a user who has put on the virtual reality headset while sitting in the vehicle. Head movements of the virtual reality headset and thus head movements of the user concerned are converted one-to-one into corresponding changes of perspective within the displayed virtual environment. The inertial measurement unit attached to the virtual reality headset captures or measures movements of the virtual reality headset with respect to the outside world, i.e. a local gravitational vector. This inertial measurement unit on its own can, however, not distinguish between movements of the virtual reality headset while the vehicle is stationary, movement of the vehicle while the virtual reality headset is stationary with respect to the vehicle, and a combination thereof, but can only capture or measure the superposition of movement of the vehicle with respect to the outside world, i.e. the fixed world reference frame, and movement of the virtual reality headset with respect to the vehicle, in particular a vehicle interior of the vehicle. By combining data from the inertial measurement unit attached to the virtual reality headset with the vehicle localisation data, the movement of the virtual reality headset with respect to the vehicle interior can be isolated, i.e. determined. For example, the vehicle localisation data or the movement of the vehicle it describes can—in simplified terms—be subtracted from the data captured or measured by the inertial measurement unit attached to the virtual reality headset or the movement or orientation described thereby.

The invention is further based on the insight that in the use of such inertial measurement units a so-called drift can occur. The inertial measurement unit typically measures acceleration and angular velocity, which can be integrated to determine orientation in space, i.e. 3 degrees of freedom (dof). This can mean that in particular rotational or turning movements of the virtual reality headset are integrated by means of the inertial measurement unit in such a way that after a certain time the detected alignment of the virtual reality headset and thus also of the head of the wearer of the virtual reality headset no longer corresponds to the actual alignment. The inertial measurement unit can include, for example, a spatial combination of several inertial sensors, such as linear acceleration sensors and angular rate sensors.

In order to counteract this so-called drift, the method according to the invention provides that a relative arrangement of the virtual reality headset with respect to the vehicle interior of the vehicle is determined at predetermined time intervals by means of a visual or optical tracking using an optical capture device arranged on the virtual reality headset. The optical tracking determines the arrangement of the virtual reality headset inside, i.e. with respect to the vehicle interior. It may be provided, for example, that the inertial measurement unit determines the instantaneous orientation of the virtual reality headset at a substantially higher rate than the optical capture device determines the relative arrangement of the virtual reality headset with respect to the vehicle interior. However, due to the tendency of the data from the inertial measurement unit to drift over time and because the optical tracking can rely on a fixed reference that does not drift over time, the relative arrangement determined based on the optical tracking can be more precise and/or more reliably than the instantaneous orientation determined by the inertial measurement unit alone.

The instantaneous orientation of the virtual reality headset determined based on the data from the inertial measurement unit attached to the virtual reality headset and the vehicle localisation data, and the relative arrangement of the virtual reality headset determined through the optical tracking are fused together. For example, both data can be provided as input to a filter, in particular a Kalman filter, specifically an error-state extended Kalman filter (ESKF). This means that effectively a comparison is carried out between the orientation determined by means of the inertial measurement unit and the orientation of the virtual reality headset determined by means of the optical capture device. Thereby as a result the orientation of the virtual reality headset relative to the vehicle interior is determined, regardless whether the vehicle is moving or not. Based on this, the virtual perspective on the virtual environment displayed by means of the virtual reality headset is simulated. Since the optical tracking provides reliable, i.e. correct data, through the fusion of both sources or streams of data—from the inertial measurement unit and the optical capture device—any drift or inaccuracy from the inertial measurement unit is smoothly corrected. In other words, at least the determined orientation resulting from the data fusion and therefore the virtual perspective is pulled towards the correct value without any jumps or discontinuities in the displayed virtual environment or the virtual perspective thereon.

The orientation of the virtual reality headset can be continuously or repeatedly determined based on the output of the fusion or filter as it becomes available. Between updates from the—lower frequency—optical tracking, at least the orientation of the virtual reality headset can only or mainly be determined based on the inertial measurement unit. This can take place until the instantaneous relative arrangement of the virtual reality headset in relation to the vehicle interior has again been determined by means of the optical capture device, after which this optically determined arrangement can again be fed into the filter or data fusion process to automatically correct at least the orientation of the virtual reality headset and subsequently the simulation of the virtual perspective.

The said correction of the data from inertial measurement unit is thus carried out again and again at specified intervals depending on the frequency of the optical tracking, so that the previously mentioned drift of the inertial measurement unit can be counteracted. This makes it possible to ensure, especially in a moving vehicle, that the instantaneous orientation of the virtual reality headset and thus the instantaneous orientation of the head of the wearer of the virtual reality headset can be reliably and exactly determined at all times and that head movements of the wearer of the virtual reality headset can be correctly converted into corresponding changes of perspective within the virtual environment. This results in a particularly immersive experience for the wearer of the virtual reality headset and can help to avoid or limit symptoms of motion sickness.

With the method according to the invention, it is in particular possible to determine the respective alignment of the virtual reality headset and thus the head alignment of the wearer of the virtual reality headset in an especially robust and high-resolution manner. The inertial measurement unit can continuously determine the instantaneous orientation of the virtual reality headset and thus the head alignment with a very high temporal resolution. If, for example, the optical capture device is not able to determine the alignment of the virtual reality headset with the corresponding clock rate or temporal resolution, it is possible in the meantime to use only or mainly the information from the inertial measurement unit—where applicable in combination with the vehicle localisation data—as the basis for simulating the virtual perspective of the virtual environment. Whenever at least the relative orientation of the virtual reality headset with respect to the interior of the vehicle has once again been determined by means of the optical capture device, the said correction by means of the described fusing in of this data is—if necessary—then carried out. In order to make the capture range of the optical capture device as large as possible, it can have various optical sensors, attached at different locations on the virtual reality headset.

The inertial measurement unit attached to the virtual reality headset can provide the orientation of the virtual reality headset in 3 orientational degrees of freedom. The optical tracking by means of the optical capture device can additionally provide one or more, in particular up to 3, positional degrees of freedom, for example depending on a complexity and accuracy of the optical tracking and/or an optical reference used for the optical tracking. Through these additional degrees of freedom the position of the virtual reality headset in space can be described, for example in or with respect to a given reference frame or coordinate system fixed to the vehicle interior. Therefore, ideally a full pose of the virtual reality headset in 6 degrees of freedom (dof), i.e. its orientation and position, can be determined. The pose or corresponding pose data describing the pose of the virtual reality headset in more than 3 degrees of freedom can then be used as input for the data fusion, i.e. for correcting or counteracting the drift of the inertial measurement unit. The virtual perspective on the displayed virtual environment can then be simulated not only on the determined orientation of the virtual reality headset but also based on any or all additional determined positional data that describes the position of the virtual reality headset in space in one or more degrees of freedom.

If the optical tracking or any optical or visual reference used therein lacks the necessary complexity, definition, resolution and/or confidence to determine the full pose of the virtual reality headset, i.e. does not provide sufficient constraints to determine the orientation as well as the position completely, it is possible to only determine and provide pose data for the virtual reality headset in 4 or 5 degrees of freedom, namely the 3 orientational degrees of freedom and any available positional degrees of freedom. This can still be beneficial for providing or leading to improved accuracy and reliability by correcting or limiting the effects of the possible drift of the data from the inertial measurement unit at least in the respective degrees of freedom. If the data obtained from the optical capture device lacks accuracy or has a relatively low confidence value, a corresponding lower weight can be applied to it for the fusion with the data from the inertial measurement unit attached to the virtual reality headset. In general, the optical tracking can be used as a reference or to correct for anywhere from 1 to 6 degrees of freedom. This means that the optical tracking can be used to provide additional data for different degrees of freedom that the ones covered by the inertial measurement unit and/or for one or more degrees of freedom that are covered by the inertial measurement unit. For example, the optical tracking can provide a reference for at least one direction, most beneficially a forward facing direction of a seat occupied by the respective wearer or user of the virtual reality headset, and thus correct orientation data provided by the inertial measurement unit for at least one direction or orientation or angle.

Overall, the combination of the inertial measurement unit and the optical tracking can provide improved robustness to the method and a respective system or device, while the inclusion of the vehicle localisation data can enable correct simulation of the virtual perspective even in a moving vehicle. For example, when an optical or visual reference used for the optical tracking is not in a current field of view of the optical capture device, and/or image data captured by the optical capture device is not valid—e.g. due to darkness, motion blur, etc.—the data from the inertial measurement unit can be relied upon at least for a time to continue determining or tracking at least the orientation of the virtual reality headset until valid image data from the optical capture device becomes available again.

A possible configuration of the invention provides that a visual or optical reference is arranged on a vehicle component, in particular on the rear side of a headrest, wherein the capture device recognises the visual reference and, based thereon, determines the relative arrangement of the virtual reality headset with respect to the vehicle component and thereby to the vehicle interior. If the wearer of the virtual reality headset sits in the rear area of the vehicle, for example on a back seat of a motor vehicle, there is usually always a headrest in front of him. This headrest can serve to correct the data from the inertial measurement unit or the orientation or pose of the virtual reality headset repeatedly, said visual reference being arranged at the rear of the headrest so that the capture device can recognise the visual reference and, based thereon, determine the relative arrangement of the virtual reality headset with respect to the vehicle component, i.e. the headrest, and thereby to the vehicle interior. The visual reference can in particular be designed in such a way that the capture device can recognise the visual reference particularly easily and unambiguously and can thus distinguish it from other elements in the vehicle interior. This makes it possible in a particularly simple and reliable way to determine the relative arrangement of the virtual reality headset with respect to the vehicle interior by means of the capture device in order to correct the data from the inertial measurement unit on the basis of this, where necessary.

Presently, whenever the or a component of the vehicle is mentioned, a respective feature, development, or process may be applied to multiple components of the vehicle or the entire vehicle interior.

A further possible configuration of the invention provides that a logo or a two-dimensional code, in particular an April tag or QR code, or a light source operated with a predetermined light pattern, is used as the visual reference. A logo, a two-dimensional code, for example in the form of an April tag or QR code, can be recognised particularly easily and reliably by means of the capture device in order to determine the relative arrangement of the virtual reality headset with respect to the vehicle interior. It is also possible, for example, to attach one or more LEDs to said vehicle component, for example to the rear of the headrest, a specific light pattern being generated that can be recognised particularly easily and reliably by the capture device in order, based thereon, to determine the relative arrangement of the virtual reality headset with respect to the vehicle interior. If only one LED is used, this can be sufficient to determine the pose of the virtual reality headset in one or two degrees of freedom. More LEDs can be provided to enable determining of the pose of the virtual reality headset in more degrees of freedom. For this purpose, multiple LEDs can be arranged in the predetermined pattern or arrangement, for example with distinct or different distance between different pairs of neighbouring LEDs. Each of the LEDs can uniquely identifiable, for example through individual unique colours of respectively emitted light, unique blinking patterns and/or frequencies, etc. The blinking patterns, i.e. the manner in which the individual LEDs are switched on and off, can for example encode repeating binary numbers assigned to each LED. These adaptations can make the pose of the pattern or array of LEDs more reliably and accurately identifiable from different points of view and under different orientations of the capture device.

According to another possible configuration of the invention, it is provided that the visual reference is phosphorescent and/or backlit or illuminated. This is particularly useful if the visual reference itself cannot be illuminated. In this case, it is nevertheless possible to reliably recognise the visual reference by means of the capture device even in poor lighting conditions, so that, based thereon, the relative arrangement of the virtual reality headset with respect to the vehicle interior can be determined at all times.

A further possible configuration of the invention provides that the capture device itself recognises a given vehicle component and, based thereon, determines the relative arrangement of the virtual reality headset with respect to the vehicle component. The vehicle component can be the vehicle component previously mentioned above, that is to say, for example, a headrest. Alternatively, other types of vehicle components in the vehicle interior are also possible. In this case, the capture device is therefore configured to recognise the said vehicle component itself, i.e. without the need to attach a specific visual reference to the vehicle component. For vehicle occupants, therefore, the vehicle component concerned has its usual appearance, since no visual reference or the like is attached to it.

In a further possible embodiment of the invention, it is provided that a digital model of the vehicle component is provided, the capture device recognising the vehicle component by a comparison with the digital model. The digital model may be a kind of mesh or grid model or another kind of digital model, in particular a 3D model. The digital model may be relatively sparse to reduce the amount of corresponding data or relatively dense to possible provide a more accurate and detailed representation of the vehicle component. By providing the digital model of the vehicle component, using the capture device it is possible in a particularly simple and reliable manner to check optically captured elements in the vehicle interior by comparison with the digital model and, where necessary, to recognise whether they are parts of the vehicle component concerned, in order to determine once again the relative position of the virtual reality headset with respect to the vehicle interior of the vehicle. As part of the model or its metadata a fixed pose of the vehicle component in and with respect to the vehicle interior can be provided.

A further possible configuration of the invention provides for the digital model to be created in a vehicle-specific manner. For example, if the vehicle component is a headrest, this headrest installed in a specific vehicle variant is provided as a digital model. For this purpose, an interior scan or the like can, for example, be carried out on the vehicle model concerned once in order to generate the digital model of the vehicle component concerned. The advantage of this procedure is that the digital model is at least substantially or even completely identical to the vehicle component to be captured. This enables the capture device to recognise the relevant vehicle component particularly easily, and, based thereon, to determine the relative arrangement of the virtual reality headset with respect to the vehicle interior of the vehicle.

An alternative possible embodiment of the invention provides that the digital model is created as a non-vehicle specific model. Thus, instead of creating a very precise digital model for each vehicle variant or vehicle component variant, it may also be provided to create and provide a generic or standard or default digital model which is not specific to the vehicle or vehicle component variant. For example, if the vehicle component is the said headrest, it can be assumed that headrests usually have certain common features. These common features can be incorporated into the non-vehicle specific or non-vehicle component specific digital model. This means that it is not necessary to provide an exact digital model of every vehicle interior or vehicle component concerned. Instead, it may be sufficient to provide the non-vehicle specific or non-component specific digital model, the capture device still being able to recognise the vehicle component concerned well enough on the basis of the digital model to determine the relative arrangement of the virtual reality headset with respect to the vehicle interior of the vehicle. Since there may be some differences between the provided, pre-built model and the actual vehicle component in a specific vehicle, a predetermined approach for model matching in the presence of errors or outliers, such as a RANSAC or Iterative Closes Point (ICP) method can be applied. Thereby, a corresponding transformation can be computed for aligning the provided digital model with an image of the respective actual vehicle component captured by means of the capture device or a digital model of the respective actual vehicle component built from the image or from a sequence of images. This can facilitate more accurate and reliable recognition of the actual vehicle component concerned despite incomplete conformity with the provided generic digital model.

The provided model can be pre-built, i.e. provided as part of the system or device for carrying out the method according to the present invention, for example with first delivery of the vehicle or the virtual reality headset. Alternatively, the provided model can be automatically generated from image date captured by the capture device attached to the virtual reality headset, for example in an initialisation process when the virtual reality headset is first switched on or first used in the or a vehicle. It can be possible to use a first observation of the vehicle component or a part of the vehicle interior as the provided digital model to which then all later observations, i.e. images made by the capture device can be matched.

If the matching of a current image or observation made by the capture device to the provided digital model is too inaccurate, i.e. if it has an alignment error that is greater than a predetermined threshold, then the tracking of the virtual reality headset can be downgraded to 3 degrees of freedom, i.e. its orientation. The digital model of the vehicle component can then still be used as a visual reference for or to determine at least one direction with respect to the vehicle interior, in particular the actual forward direction, assuming a position of the user or wearer of the virtual reality headset inside the vehicle is known. This can still provide significant benefit in counteracting the drift of the inertial measurement unit, in particular since the forward direction is typically the most relevant direction for simulation of the virtual perspective.

A further possible configuration of the invention provides that a series of images of a part of the vehicle interior is captured, at least one feature of the vehicle interior being detected in several individual images of the series of images, and a change in position of this feature on the individual images is determined and, based thereon, the relative arrangement of the virtual reality headset with respect to the vehicle interior. This procedure can be referred to as frame-to-frame visual tracking. In this way, detection or extraction of a feature, in particular a feature extraction, a feature matching between the different individual images and also a feature tracking between the individual images can be carried out. In particular, it may also be provided that the relevant feature of the vehicle interior concerned is measured once, data being provided as to where the feature is located in the vehicle coordinate system concerned. If it is then assumed that the location of the feature in question within the vehicle is fixed, it is relatively easy to determine, by monitoring the change in position of the detected feature on the individual images, how the capture device and thus the virtual reality headset has been moved. In this way, it is possible to determine very precisely how the virtual reality headset is actually orientated at any given moment, and this information can then be used in the manner previously described to correct for the drift of the inertial measurement unit if necessary. This method can also provide position information, so that the pose of the virtual reality headset may be determined in more than the 3 orientational degrees of freedom, in particular its full pose in 6 degrees of freedom, i.e. roll, pitch, yaw, x, y, and z with the latter denoting the position in space in the vehicle coordinate system.

In this approach no specific fixed reference for the optical tracking has to be provided. However, loop closures might be used to compensate for drift in the frame-to-frame visual tracking in combination with the data from the inertial measurement unit, i.e. in the respective data fusion result.

In further possible configurations of the invention it is provided that objects located at a predetermined distance from the capture device are disregarded. Thus, for example, it may be provided that objects located several centimetres away from the capture device are not taken into account at all when capturing and evaluating the series of images. In this way, it can in particular be ensured that objects located outside the vehicle are not taken into account at all, especially since it can be assumed that everything outside the vehicle is usually further away than, for example, the said vehicle component, in particular said headrest, which is to be recognised, and may move independently of the vehicle, which could disturb accurate tracking. This procedure can also be used to ensure that, for example, no attention is paid to other passengers sitting next to the wearer of the virtual reality headset or at least somewhere inside the same vehicle. The fact that objects located more than the said predetermined distance from the capture device are not taken into account at all when evaluating the individual images, for example at a distance of 40 cm, 50 cm or similar, means that a particularly reliable result can be achieved. This means that the actual alignment of the virtual reality headset determined by means of the optical capture device is particularly exact.

Another possible configuration of the invention provides that a convolutional neural network (CNN) is used to detect, i.e. extract the feature. In particular, using such a neural network it is also possible to label different image pixels as to whether these relate to components in the vehicle interior or outside the vehicle. For example, pixels relating to the environment outside the vehicle and also vehicle occupants can be masked using the convolutional neural network, so that in each individual image in the series of images only relevant points in the vehicle interior are present. Only these pixels or points can then be used to determine with particular accuracy how the virtual reality headset is presently actually aligned in the previously described manner. The neural network may be trained using provided training data, i.e. a variety of correctly labelled images. The training data may be generated automatically or semi-automatically based on the insight that vehicle interiors are usually mostly monochromatic. An automatic or semi-automatic process can therefore be implemented that differentiates between pixels belonging to the vehicle interior and pixels belonging to the outside environment or passengers based on pixel colour. For a specific vehicle, the predominant colour of the vehicle interior can be provided as an input parameter or it can be determined automatically. Such a process of automatically or semi-automatically generating labelled training data for the neural network can greatly increase the speed and decrease the required effort for creating the trained neural network.

The control device in accordance with the invention for operating a virtual reality headset in a vehicle is so configured, based on at least an instantaneous orientation of the virtual reality headset that is continuously determined by means of an inertial measurement unit arranged on the virtual reality headset and provided vehicle localisation data that at least partly characterises or describes a pose and/or movement of the vehicle with respect to the fixed world reference frame, to simulate a virtual perspective on a virtual environment displayed by means of the virtual reality headset. Furthermore, the control device is so configured, based on a relative arrangement of the virtual reality headset with respect to the vehicle interior of the vehicle that is determined at predetermined time intervals by means of an optical tracking carried out by means of an optical capture device arranged on the virtual reality headset. Furthermore, the control device is so configured, based on at least an orientation of the virtual reality headset that is continuously or repeatedly determined by means of fusion of at least the determined instantaneous orientation of the virtual reality headset with the optically determined relative arrangement, to simulate the virtual perspective on the virtual environment displayed by the virtual reality headset. The described configurations of the method according to the invention are to be seen as possible configurations of the control device and vice versa, wherein in particular the control device is provided with means for carrying out the process steps of the method according to the present invention.

Further features of the invention may be derived from the following description of the FIGURE as well as from the drawing. The features and combinations of features mentioned above in the description as well as the features and combinations of features shown hereafter in the description of the FIGURE and/or in the FIGURES alone can be used not only in the combination indicated in each case, but also in other combinations or on their own without departing from the scope of the invention.

The drawing shows, in the single FIGURE, a schematic representation of a motor vehicle in which sits a user who has put on a virtual reality headset.

A motor vehicle 1 is shown in a highly schematic representation in FIG. 1. In the motor vehicle sits a person 2 who has put on a virtual reality headset 3. The virtual reality headset 3 further comprises a control device 4 for controlling the virtual reality headset 3, an inertial measurement unit 5 and a capture device 6. Both the inertial measurement unit 5 and the capture device 6 are attached to the virtual reality headset 3. In front of the person 2 a headrest 7 is also schematically indicated, to which a visual reference 8 is applied. The motor vehicle 1 is fixedly equipped with a vehicle localisation system 10 that can provide vehicle localisation data describing the pose and/or movement of the motor vehicle 10 in the outside world, i.e. with respect to a fixed world reference frame or coordinate system to the control device 4, for example via a wireless data connection.

A procedure for operating the virtual reality headset 3 is explained below. While a virtual environment is displayed by means of the virtual reality headset 3, the inertial measurement unit 5 continuously determines an instantaneous orientation of the virtual reality headset 3. Since the inertial measurement unit 5 does not measure the orientation of the virtual reality headset relative to the car but relative to the outside fixed world reference frame, its data can be combined with the vehicle localisation data provided by the vehicle localisation system 10. This enables determination of the orientation of the instantaneous orientation of the virtual reality headset 3 with respect to the motor vehicle 1, in particular its vehicle interior 9, i.e. a vehicle coordinate system moving with the motor vehicle 1. Corresponding data characterising at least the respective instantaneous orientation, and possibly a position, of the virtual reality headset 3 are transmitted to the control device 4. Based on these data, the control device 4 simulates a virtual perspective of the person 2 on the virtual environment currently displayed by the virtual reality headset 3. The virtual environment can, for example, be a scene in a computer game. If person 2 with the virtual reality headset 3 on turns his head, for example to the left or to the right, the virtual perspective displayed within the computer game changes accordingly. Within the displayed virtual environment, the person 2 also moves his head to the left or right accordingly. In particular, turning movements of person 2 with his head are thus converted more or less one-to-one within the displayed virtual environment. Of course, translational movements of the head of person 2 can also be implemented accordingly.

With such an inertial measurement unit 5, the problem may arise that a so-called drift occurs over time if the data obtained by means of, for example, acceleration sensors, angular velocity sensor, and/or other sensors of the inertial measurement unit 5 provide visibly slightly incorrect data when integrated, i.e. the actual head orientation of person 2 or the actual orientation of the virtual reality headset 3 is no longer reproduced exactly.

Therefore, it is provided that a relative arrangement, in particular the pose, of the virtual reality headset 3 with respect to the vehicle interior 9 of motor vehicle 1 is determined at predetermined time intervals by means of the optical capture device 6 arranged on the virtual reality headset 3. The optical capture device 6 can therefore for its part determine the alignment or orientation of the virtual reality headset 3 and does so relative to the vehicle interior 9. The respectively determined orientations or poses of the virtual reality headset 3, which were determined by means of the inertial measurement unit 5 and by means of the capture device 6 are fused together, in particular by feeding them as input into an error-state extended Kalman filter provided as part of the control device 4. This provides as an output of the filter a corrected orientation or pose of the virtual reality headset 3 that is smoothly corrected for the drift of the inertial measurement unit 5. Here, the alignment or arrangement of the virtual reality headset 3 determined by means of the optical capture device 6 is assumed to be the correct alignment. The virtual perspective on the virtual environment displayed by means of the virtual reality headset 3 is then adapted, i.e. simulated based on the corrected orientation or pose. At specified time intervals, the optical capture device 6 once again carries out its own procedure to determine the orientation or pose of the virtual reality headset 3 relative to the vehicle interior 9, so that based on the data thus obtained—so far as necessary—the previously described smooth correction of the drift of the inertial measurement unit 5 can be carried out again through fusion of the respective data. The fusion, i.e. combination or comparison of the data obtained from the inertial measurement unit 5 and the vehicle localisation system 10 on the one hand and from the optical capture device 6 on the other hand, is enabled through the use of the vehicle localisation data to isolate from the total movement detected by means of the inertial measurement unit 5 the component of this movement of the virtual reality headset 3 relative to the vehicle interior 9.

The optical capture device 6 may, for example, be configured to recognise the visual reference 8 on the headrest 7 and, based thereon, to determine the relative arrangement of the virtual reality headset 3 to the headrest 7 and thus also to the vehicle interior 9. The visual reference 8 can be a logo or a two-dimensional code, for example in the form of a so-called April tag or QR code. The visual reference 8 can also be, for example, one or more LEDs that are operated with a specific light pattern, so that the optical capture device 6 can detect this light pattern or the relevant LEDs particularly easily.

In particular if the visual reference 8 is not some form of light source, it may be provided that the visual reference 8 is phosphorescent and/or backlit or illuminated. In this way, even in poor lighting conditions, the optical capture device 6 can easily recognise the visual reference 8 at all times.

Instead of providing the visual reference 8 on the headrest 7, it may also be provided that the capture device 6 is configured to recognise the headrest 7 itself and, based on this, to determine the relative arrangement of the virtual reality headset 3 to the headrest 7 and thus to the vehicle interior 9. For this purpose, for example, an exact digital model of the headrest 7 can be provided, so that the optical capture device 6 can recognise the headrest 7 by a comparison with this digital model. In order not to have to provide different specific digital models for different motor vehicles 1 or different headrests 7, it may also be provided that a digital model valid for all vehicles or headrests is provided, in which certain typical headrest features such as certain edges or geometric properties are provided. It is also possible in this case that the optical capture device 6 can recognise the respective headrest 7 by means of a comparison with the digital model concerned and thus determine the alignment of the virtual reality headset 3 with respect to the headrest 7 and thus with respect to the vehicle interior 9.

It is also possible for the capture device 6 to capture a series of images of a part of the vehicle interior 9, in several individual images of the series of images at least one feature of the vehicle interior 9 being detected, and a change of position of this feature on the individual images being determined, and, based thereon, the relative arrangement of the virtual reality headset 3 with respect to the vehicle interior 9 is determined. The feature can be, for example, a part of the headrest 7 or completely different components in the vehicle interior 9. This so-called frame-to-frame visual tracking also makes it possible to determine by means of the optical capture device 6 the exact alignment or arrangement of the virtual reality headset 3 with respect to the vehicle interior 9 at specified intervals, in order to—if necessary—carry out based on this data the said correction of the orientation or pose data provided by the inertial measurement unit 5. In this context, it may in particular be provided to disregard any objects located at more than a predetermined distance from the capture device 6. If, for example, the headrest 7 is to be recognised by means of the optical capture device 6, this being, for example, at a maximum distance of 70 cm from the capture device 6 in the case of a vehicle occupant sitting on the rear seat, it can be specified that all objects which are more than 70 cm away from the capture device 6 are not to be taken into account at all. In this way can be ruled out, for example, that objects located outside motor vehicle 1 or other vehicle occupants not shown here are tracked or detected. In this way it can be ensured that the actual alignment of the virtual reality headset 3 can be determined in a particularly precise manner by means of the optical capture device 6. Alternatively or additionally, it is also possible, for example, to use a convolutional neural network to detect the said feature. By means of such a neural network it is possible, for example, to classify individual image pixels and, based on this, to recognise which of the pixels belong to the vehicle interior 9 and which do not. The pixels not belonging to the vehicle interior 9 can, for example, be masked out.

By means of the described method for operating the virtual reality headset 3, it is possible in a particularly reliable way to determine very precisely the alignment of the virtual reality headset 3 and thus the head alignment of person 2, in order to implement respective head alignments or head movements of person 2 in the virtual environment displayed by the virtual reality headset 3.

LIST OF REFERENCE NUMERALS

1 Motor vehicle
2 Person
3 Virtual reality headset
4 Control device
5 Inertial measurement unit
6 Capture device
7 Headrest
8 Visual reference
9 Vehicle interior
10 vehicle localisation system

The invention claimed is:

1. A method of operating a virtual reality headset in a vehicle, in which
   vehicle localization data that at least partly characterizes a pose and/or movement of the vehicle with respect to a fixed world reference frame is captured and provided,
   instantaneous orientation of the virtual reality headset with respect to a vehicle interior of the vehicle is continuously determined based on an inertial measurement carried out by an inertial measurement unit arranged on the virtual reality headset and the vehicle localization data, and based thereon a virtual perspective on a virtual environment displayed by means of the virtual reality headset is simulated;
   wherein,
   at predetermined time intervals an optical tracking is carried out by means of an optical capture device arranged on the virtual reality headset which determines an arrangement of the virtual reality headset relative to the vehicle interior of the vehicle;
   after which at least an orientation of the virtual reality headset relative to the vehicle interior is determined by means of fusion of the determined instantaneous orientation and the optical tracking, and, based thereon, the virtual perspective on the virtual environment displayed by means of the virtual reality headset is simulated, wherein the fusion counteracts a drift of the inertial measurement unit.

2. The method according to claim 1, wherein
   a visual reference is arranged on a vehicle component, wherein the capture device recognizes the visual reference and, based thereon, determines the relative arrangement of the virtual reality headset with respect to the vehicle component and thereby to the vehicle interior.

3. The method according to claim 2, wherein
   the visual reference used is a logo or a two-dimensional code, or a light source operated with a predetermined light pattern.

4. The method according to claim 3, wherein
   the visual reference used is a logo or a two-dimensional code in the form of an April tag or QR code.

5. The method according to claim 3, wherein
   the visual reference used is a light source operated with a predetermined light pattern in the form of at least one LED.

6. The method according to claim 2, wherein
   the visual reference is arranged on a rear side of a headrest.

7. The method according to claim 1, wherein
   the visual reference is phosphorescent and/or backlit or illuminated.

8. The method according to claim 1, wherein
   the capture device itself recognizes a predetermined vehicle component and, based thereon, determines the relative arrangement of the virtual reality headset with respect to the vehicle component and thereby to the vehicle interior.

9. The method according to claim 8, wherein a digital model of the vehicle component is provided, wherein the capture device recognizes the vehicle component by a comparison with the digital model.

10. The method according to claim 9, wherein
    the digital model is created in a vehicle-specific manner.

11. The method according to claim 9, wherein
    the digital model is created as a non-vehicle specific model.

12. The method according to claim 1, wherein
    a series of images is captured of a part of the vehicle interior, at least one feature of the vehicle interior in a plurality of individual images of the series of images and a change in position of this feature in the individual images is detected and, based thereon, the relative arrangement of the virtual reality headset with respect to the vehicle interior is determined.

13. The method according to claim 12, wherein
    objects located at more than a predetermined distance from the capture device are disregarded.

14. The method according to claim 12, wherein
    a convolutional neural network is used to detect the at least one feature.

15. A control device for operating a virtual reality headset in a vehicle, which is so configured, based on
    at least a continuously determined, by means of an inertial measurement unit arranged on the virtual reality headset and provided vehicle localization data that at least partly characterizes a pose and/or movement of the vehicle with respect to a fixed world reference frame, instantaneous orientation of the virtual reality headset, to simulate a virtual perspective on a virtual environment displayed by means of the virtual reality headset;
    wherein, the control device is configured to operate the virtual reality headset additionally based on
    a relative arrangement of the virtual reality headset with respect to the vehicle interior of the vehicle determined at predetermined time intervals by means of an optical capture device arranged on the virtual reality headset for carrying out an optical tracking;
    at least a continuously, by means of fusion of the determined instantaneous orientation with the determined relative arrangement, determined orientation of the virtual reality headset, to simulate the virtual perspective on the virtual environment displayed by the virtual reality headset.

* * * * *